(12) United States Patent
Yasui et al.

(10) Patent No.: US 9,885,791 B2
(45) Date of Patent: Feb. 6, 2018

(54) SCINTILLATOR AND RADIATION DETECTOR (71) Applicant: CANON KABUSHIKI KAISHA, Tokyo (JP)

(72) Inventors: Nobuhiro Yasui, Yokohama (JP); Yoshinori Shibutani, Tokyo (JP); Yoshihiro Ohashi, Tokyo (JP); Toru Den, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 910 days.

(21) Appl. No.: 14/193,423

(22) Filed: Feb. 28, 2014

(65) Prior Publication Data
US 2017/0205514 A1    Jul. 20, 2017

(30) Foreign Application Priority Data

Mar. 5, 2013 (JP) ................................. 2013-042880
Feb. 21, 2014 (JP) ................................. 2014-031327

(51) Int. Cl.
*G01T 1/20*    (2006.01)
*G01T 1/202*   (2006.01)

(52) U.S. Cl.
CPC ............ *G01T 1/2002* (2013.01); *G01T 1/202* (2013.01)

(58) Field of Classification Search
CPC .................................................... G01T 1/2002
See application file for complete search history.

(56) References Cited

U.S. PATENT DOCUMENTS

| | | | |
|---|---|---|---|
| 5,831,269 A | 11/1998 | Nakamura et al. | |
| 6,391,434 B1 | 5/2002 | Duclos | |
| 6,860,982 B2 | 3/2005 | Okura et al. | |
| 6,911,251 B2 | 6/2005 | Duclos | |
| 7,315,027 B2 | 1/2008 | Okada et al. | |
| 7,348,670 B2 | 3/2008 | Den et al. | |

(Continued)

FOREIGN PATENT DOCUMENTS

| | | | |
|---|---|---|---|
| JP | 62-124484 A | 6/1987 | |
| JP | 2000-009847 A | 1/2000 | |

(Continued)

OTHER PUBLICATIONS

Extended European Search Report in European Application No. 14157567.0 (dated Jun. 27, 2014).

(Continued)

*Primary Examiner* — David Porta
*Assistant Examiner* — Hugh H Maupin
(74) *Attorney, Agent, or Firm* — Fitzpatrick, Cella, Harper & Scinto (57) ABSTRACT

In a related-art composite scintillator in which pores in a porous scintillator are filled with an absorbing member or the like, as the ratio between the structural period of the composite and the thickness in an optical waveguide direction becomes smaller, almost all light is absorbed, and, in some cases, it is difficult to obtain a sufficient light amount for forming an adequate image. Provided is a scintillator including multiple first phases having directionality in a direction connecting two surfaces thereof which are not located on same surface and a second phase positioned around the first phases, in which each of the multiple first phases is in the shape of a column, and an absorbing portion is provided in part of one of the two kinds of phases, which has a lower refractive index.

31 Claims, 8 Drawing Sheets

(56) References Cited

U.S. PATENT DOCUMENTS

| | | |
|---|---|---|
| 8,435,899 B2 | 5/2013 | Miyata et al. |
| 8,586,931 B2 | 11/2013 | Horie et al. |
| 8,618,489 B2 | 12/2013 | Ohashi et al. |
| 8,669,527 B2 | 3/2014 | Ueyama et al. |
| 8,674,309 B2 | 3/2014 | Yasui et al. |
| 8,993,969 B2 | 3/2015 | Yasui et al. |
| 2005/0081912 A1 | 4/2005 | Okura et al. |
| 2007/0158573 A1 | 7/2007 | Deych |
| 2011/0223323 A1 | 9/2011 | Ohashi et al. |
| 2013/0026374 A1 | 1/2013 | Saito et al. |
| 2013/0341512 A1 | 12/2013 | Ohashi et al. |
| 2014/0084167 A1 | 3/2014 | Ohashi et al. |
| 2014/0110587 A1 | 4/2014 | Ohashi et al. |

FOREIGN PATENT DOCUMENTS

| | | |
|---|---|---|
| JP | 2001-058881 A | 3/2001 |
| JP | 2012-131964 A | 7/2012 |
| JP | 2013-029356 A | 2/2013 |
| WO | 2005/038490 A1 | 4/2005 |
| WO | 2012/133603 A2 | 10/2012 |
| WO | 2013/015454 A2 | 1/2013 |

OTHER PUBLICATIONS

Ohashi et al., U.S. Appl. No. 14/123,575, filed Dec. 3, 2013.
Notification of Reasons for Refusal in Japanese Application No. 2014-031327 (dated Oct. 26, 2017).

SCINTILLATOR AND RADIATION DETECTOR

BACKGROUND OF THE INVENTION

Field of the Invention

The present invention relates to a scintillator which emits light when radiation is applied thereto, and a radiation detector using the scintillator.

Description of the Related Art

In a flat panel detector (FPD) used in clinical practice or the like, X-rays which pass through a subject are received by a scintillator, and light emitted from the scintillator is detected by light receiving elements serving as a detector. The light receiving elements are arranged as a two-dimensional array. Japanese Patent Application Laid-Open No. 2001-58881 discloses a scintillator which exhibits an optical waveguide property in order to prevent light emitted by the scintillator from spreading to an adjacent light receiving element under such circumstances. Japanese Patent Application Laid-Open No. 2001-58881 discloses a technology in which, after sacrificial fibers aligned in a direction in which light is sought to he waveguided and scintillator powder are sintered, the sacrificial fibers are removed to obtain a porous scintillator, and pores therein are filled with an absorbing member or the like.

SUMMARY OF THE INVENTION

According to one aspect of the present invention, there is provided a scintillator, which has a first surface and a second surface that are not located on a same surface, the scintillator including: multiple first phases; and a second phase positioned around the multiple first phases, in which: a refractive index with respect to wavelength range of scintillator light of the multiple first phases and a refractive index with respect to wavelength range of the scintillator light of the second phase are different from each other; and the scintillator further includes an absorbing portion for absorbing the scintillator light, the absorbing portion being provided between the first surface and the second surface in one of the multiple first phases and the second phase, which has a lower refractive index.

Further features of the present invention will become apparent from the following description of exemplary embodiments with reference to the attached drawings.

DESCRIPTION OF THE EMBODIMENTS

Japanese Patent Application Laid-Open No. 2001-58881 describes that, in a composite scintillator filled with an absorbing member, when light emitted by the scintillator through radiation excitation is going to spread in a lateral direction, the light is absorbed by entering the absorbing member, and thus, the effect of crosstalk of light can be prevented. However, as the ratio of the structural period of the composite to the thickness in an optical waveguide direction (structural period/thickness) becomes smaller, the ratio of absorbed light increases, and the amount of light which enters the array of light receiving elements (light receiving element array) reduces. Therefore, it is sometimes difficult to cause light to enter the light receiving elements with an amount enough to form an image based on the result of detection by the light receiving element array.

Exemplary embodiments of the present invention are described in the following with reference to the attached drawings.

Structure of Composite Scintillator

FIGS. 1A to 1D illustrate schematic structures of a composite scintillator according to an embodiment of the present invention.

The scintillator of this embodiment includes multiple first phases 11 and a second phase 12, and has an optical waveguide property in a direction connecting two surfaces which are not on the same surface (sometimes referred to as a first surface 26 and a second surface 25). Each of the multiple first phases is a columnar phase (cylindrical phase) having unidirectionality along the optical waveguide direction. The second phase is positioned around the first phases 11 to fill sides of the first phases 11. Such a structure in which multiple phases separately exist is referred to as a phase separation structure, and a scintillator having the phase separation structure is referred to as a phase separation scintillator. As illustrated in FIGS. 1A to 1D, each of the multiple first phases is exposed at the first surface 26 and the second surface 25. Further, generally, it is preferred that each of the multiple first phases continuously exist from the first surface 26 to the second surface 25. Similarly, it is preferred that the second phase also continuously exist from the first surface 26 to the second surface 25.

Further, an absorbing portion 15 is provided at least part of one of the first phase and the second phase that has the lower refractive index (sometimes referred to as a lower refractive index phase 13) in an extending direction thereof (the same as the optical waveguide direction). When, as in a first structure 16 illustrated in FIGS. 1A and 1C, there are multiple lower refractive index phases, it is preferred that the absorbing portion be provided in each of the multiple lower refractive index phases.

Figure 1A:
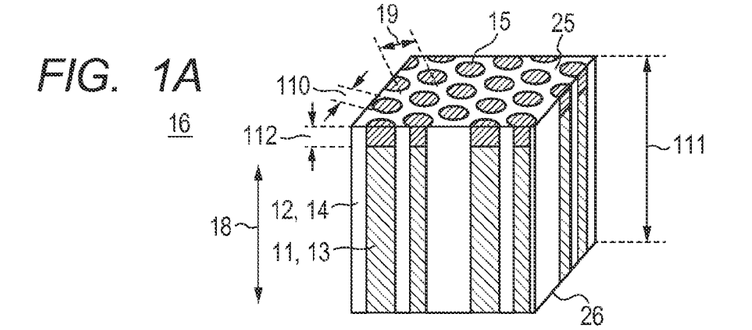
FIGS. 1A, 1B, 1C and 1D are schematic views illustrating a composite scintillator according to an embodiment of the present invention.
Figure 1B:
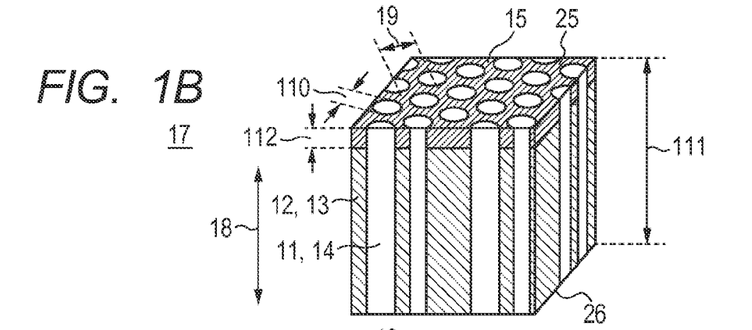
Figure 1C:
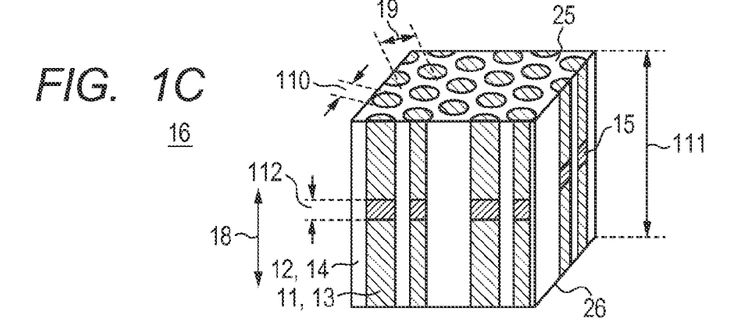
Figure 1D:
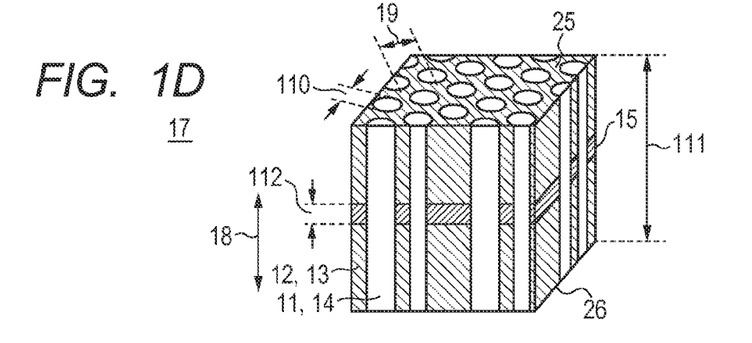

Providing the absorbing portion at a portion of the lower refractive index phase 13 which is in contact with at least one of the first surface and the second surface is preferred to providing the absorbing portion only at a portion which is in contact with neither the first surface nor the second surface, because the manufacture is easier. Further, in the following description, providing the absorbing portion at a portion which is in contact with the (first or second) surface of the lower refractive index phase is sometimes referred to as providing the absorbing portion at a surface. However, the absorbing portion may be provided only at a portion which is in contact with neither the first surface nor the second surface as illustrated in FIG. 1C and 1D. Exemplary methods of providing the absorbing portion only at a portion which is in contact with neither the first surface nor the second surface as illustrated in FIGS. 1C and 1D include a method of stacking and bonding together multiple scintillators. By stacking and bonding together a phase separation scintillator in which the absorbing portion is provided at a surface thereof as illustrated in FIG. 1A or 1B and a phase separation scintillator in which no absorbing portion is provided, the scintillator illustrated in FIG. 1C or 1D is obtained. In order to maintain the continuity between the multiple first phases 11 above and below the absorbing portion and the continuity between the second phases 12 above and below the absorbing portion as illustrated in FIGS. 1C and 1D, for example, one phase separation scintillator is cut along a plane perpendicular to the optical waveguide direction, the absorbing portion is provided, and the cut phase separation scintillators are bonded together again. However, even if the continuity between the multiple first phases above and below the absorbing portion and between the second phases above and below the absorbing portion as illustrated in FIGS. 1C and 1D is not maintained, insofar as the waveguide direction is approximately the same above and below the absorbing portion, the waveguide property of waveguiding light in the direction connecting the first surface and the second surface is almost uninfluenced. Further, the waveguide direction may be different between the phase separation scintillator above the absorbing portion and the phase separation scintillator below the absorbing portion. For example, a first phase separation scintillator which has a waveguide property in the direction connecting the first surface and the second surface and a second phase separation scintillator which has a waveguide property in a direction connecting a third surface and a fourth surface are prepared. By providing the absorbing portion at the second surface of the first phase separation scintillator and bonding the first and second phase separation scintillators together so that the absorbing portion is in contact with the third surface of the second phase separation scintillator, the waveguide direction of the scintillators which are bonded together becomes a direction connecting the first surface and the fourth surface. In this way, the waveguide directions of the phase separation scintillators which are bonded together may be different to adjust the waveguide direction of the phase separation scintillator which is formed through the bonding.

Figure 10:
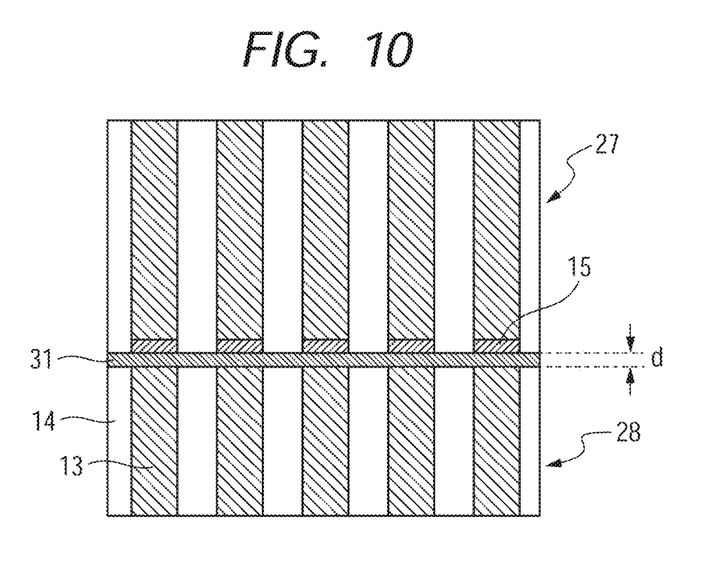
FIG. 10 is a schematic view illustrating a composite scintillator according to an embodiment of the present invention.

Note that, when phase separation scintillators are bonded together, a first phase separation scintillator 27 and a second phase separation scintillator 28 may be bonded together with a bonding layer 31 therebetween as illustrated in FIG. 10.

FIGS 1A and 1B illustrate cases in which the absorbing portion 15 is provided at only one of the first surface and the second surface, but the absorbing portion may be provided both at the first surface and at the second surface.

Note that, it is preferred that the first surface and the second surface be substantially perpendicular (±20° or less) to an extending direction 18 of the first phase (optical waveguide direction). However, as for the permitted values of the respective surfaces with respect to the extending direction of the first phase, even when specific one in the first phase does not satisfy the condition, there is no problem as long as an average value satisfies the condition.

The lower refractive index phase may be any one of the first phase 11 and the second phase 12. The first structure 16 of FIG. 1A illustrates a case in which the first phase 11 is the lower refractive index phase, while a second structure 17 of FIG. 1B illustrates a case in which the second phase 12 is the lower refractive index phase. It is preferred that at least a higher refractive index phase function as a scintillator which emits light through radiation excitation. As described below, it is preferred that the first phase and the second phase form a eutectic structure. Further, when the bonding layer 31 is provided as illustrated in FIG. 10, it is preferred that the bonding layer 31 be formed of a member having a refractive index lower than that of the higher refractive index phase. In this case, the relationship between the refractive index of the lower refractive index phase and the refractive index of the bonding layer does not matter. Further, it is preferred that a thickness d of the bonding layer be thin, and it is more preferred that the thickness d be 10 μm or less. It is further preferred that the thickness d be thinner than an average period in the phase separation scintillator. The average period may be determined by, for example, counting the number of the first phases in 1 cm. When a phase separation scintillator has a eutectic phase separation structure which is described below, the period thereof is typically 50 μm or less. Note that, a thickness described herein (thickness of a bonding layer, thickness of a scintillator, or thickness of an absorbing portion) is a thickness in the extending direction of the first phases.

Further, the first phases 11 are not limited to be in a cylindrical shape as illustrated in FIGS. 1A to 1D, and may be columnar bodies which are oval in section or columnar bodies whose sides include an arbitrary curved surface. Further, the first phases 11 may be columnar bodies which are polygonal in section and which include multiple sides.

Further, it is preferred that a diameter 110 of a column of a first phase be in a range of 50 nm or more and 30 μm or less, and a period 19 between adjacent first phases (columns) be in a range of 500 nm or more and 50 μm or less. This is because, in order to obtain the effect of the phase separation structure, the diameter and the period are required be smaller than the size of a light receiving portion of the light receiving element array. Typically, the size of a light receiving portion is 150 μm to several micrometers, and thus, a diameter and a period which are in the above-mentioned ranges, respectively, can satisfy the requirement. From a different viewpoint, it is not required that the scintillator have a spatial resolution which is higher than the size of a light receiving portion, and thus, it is preferred to avoid a situation in which the amount of received light is reduced to be less than required by increasing a thickness 112 of the absorbing portion and improving the spatial resolution to be more than required.

It is more preferred that the columns of the first phases 11 be continuous between the above-mentioned two surfaces of the scintillator, but there may be a disconnection, a branch, a union, or the like at some midpoint. Further, when the first phases 11 are the lower refractive index phase, is preferred that the first phases 11 and the absorbing portion 15 form continuous columns. Also when the phase 12 is the lower refractive index phase, it is preferred that the second phase 12 and the absorbing portion 15 are continuous. However, even if an interface between one of the two phases and the absorbing portion 15 has a mixture region of the materials thereof or a region of another material for manufacture reasons or others, there is no problem insofar as a structure as illustrated in FIGS. 1A to 1D is maintained. Also in structures illustrated in FIGS. 1C and 1D, there is no problem even if there is a structural discontinuity. When a phase separation scintillator is prepared by stacking two phase separation scintillators, it is preferred that, as illustrated in FIG. 10, a phase separation scintillator in which no absorbing portion is provided be inserted between a phase separation scintillator in which the absorbing portion is provided at an end surface thereof and the light receiving element array. At this time, for the phase separation scintillator (first phase separation scintillator) in which the absorbing portion is provided at the end surface thereof, it is preferred that the lower refractive index phase and the absorbing portion are continuous as described above. Further, even when the first and second phase separation scintillators are not bonded together such that the first phases of the first and second phase separation scintillators are brought into one-to-one correspondence and the second phases of the first and second phase separation scintillators are brought into one-to-one correspondence, the stacked scintillator can waveguide the scintillator light. Accordingly, as described above, discontinuity of the first and second phase separation scintillators is permitted. Moreover, in order to prevent generation of a gap between surfaces at the time of bonding, a bonding layer 31 is provided as illustrated in FIG. 10. In this case, the position of the absorbing portion in the entire thickness direction can be controlled as desired by adjusting the thicknesses of the first and second phase separation scintillators, but it is effective to provide the absorbing portion so as to be near the light receiving element when a higher priority is given to the spatial resolution, and to provide the absorbing portion so as to be far from the light receiving element when a higher priority is given to the amount of received light. In this way, the position of the absorbing portion may be appropriately selected to realize a desired amount of received light and a desired spatial resolution. This is described in detail below.

A thickness 111 of the scintillator may be appropriate selected in accordance with the energy of radiation to be received, and is preferably in a range of 50 μm or more and 40 cm or less and is more preferably in a range of 50 μm or more and 40 mm or less.

As the thickness 112 of the absorbing portion becomes larger, the spatial resolution becomes more improved, but the amount of light which enters the light receiving element becomes smaller. Therefore, the thickness 112 of the absorbing portion is preferably smaller than the thickness of the scintillator, more preferably 50% or less of the thickness of the scintillator, and further preferably 10 μm or less. When the amount of light is less than 10% of that in a case in which the absorbing portion is not provided, time necessary for imaging and noise are assumed to increase, and thus, it is preferred that, with regard to the phase separation scintillator of this embodiment, light enter the light receiving element with an amount 10% or more of that in a case in which the absorbing portion is not provided. When a surface facing the light receiving element array of a phase separation scintillator having a thickness of 500 μm is in contact with a member having a refractive index of 1.5, if the thickness of the absorbing portion 15 is 10 μm, a light amount which is 10% of that in a case in which the absorbing portion is not provided can be secured. Even if the thickness of the scintillator changes, the change in the relationship between the thickness of the absorbing portion and the light amount is small. This is because, when attention is paid to the absorbing portion and the vicinity thereof, the incident angle of light which is absorbed is determined by the thickness of the absorbing portion (as the thickness becomes larger, the range of the incident angle of light which is absorbed becomes wider) irrespective of the thicknesses of the scintillators thereabove and therebelow. Therefore, it is preferred that the thickness of the absorbing portion be 10 μm or less. Note that, when the thickness is 20 μm, the amount of light is about 5% of that in a case in which the absorbing portion is not provided.

Further, when, in the first structure 16, the entirety of the first phase of the scintillator having a thickness of 500 μm becomes the absorbing portion 15 in the end, there is a possibility that only light which is waveguided through only the second phase may enter the light receiving element, but part of light in a total reflection mode of the light waveguided through only the second phase is also absorbed, thereby showing a reduction of the amount of received light. Note that, according to the present invention and as used herein, a thickness is defined as a thickness along a directionality of the first phases of the scintillator (direction connecting the first surface and the second surface). Note that, the total reflection mode means conditions under which light repeats total reflection and is waveguided in the higher refractive index phase in the crystals of the phase separation scintillator. However, the mode is not limited to cases in which the entire event while a certain light beam is waveguided is total reflection, and cases in which total reflection occurs at least once are also included therein.

The absorbing portion is not specifically limited insofar as the absorption coefficient is finite in the wavelength range of light emitted by the scintillator (scintillator light), but it is preferred that the transmittance of light which enters the absorbing portion in a direction parallel to the thickness direction of the absorbing portion be 1% or less. As described above, it is preferred that the thickness of the absorbing portion be 10 μm or less, and thus, when the thickness of the absorbing portion is 10 μm, it is preferred that the absorption coefficient of the material of the absorbing portion be $4.6 \times 10^3$ [1/cm] or more. However, the absorption coefficient is a value at a peak wavelength in the spectrum of light emitted through radiation. Further, the absorbing portion may reflect part of light. Light which enters the absorbing portion may be divided into light to be reflected and light to be absorbed, into light to be reflected, light to be absorbed, and light to be transmitted, or into light to be absorbed and light to be transmitted. Even in a case where the absorbing portion reflects part of light, since it is preferred that the transmittance of light which enters the absorbing portion in a direction parallel to the thickness direction of the absorbing portion be 1% or less, when such reflection exists, the above-mentioned preferred condition of the absorption coefficient is relaxed accordingly. For example, when the reflectance of the absorbing portion is 50%, even if 2% of light which is not reflected (50% of incident light) is transmitted, the transmittance of light which enters the absorbing portion is 1%. Therefore, when the reflectance of the absorbing portion is 50% and the thickness of the absorbing portion is 10 μm, if the absorption coefficient of the material of the absorbing portion is 3.9× $10^3$ [1/cm] or more, the transmittance of light can be 1% or less. Further, when the reflectance of the absorbing portion is 90% and the thickness of the absorbing portion is 10 μm, if the absorption coefficient of the material of the absorbing portion is 2.3×$10^3$ [1/cm] or more, the transmittance of light can be 1% or less. However, the reflectance of the absorbing portion is high, light emitted from the lower refractive index phase, that is, light which is required to be absorbed to improve the spatial resolution is returned to the inside of the scintillator. Therefore, it is desired that the reflectance of the absorbing portion be 90% or less.

Figure 2A:
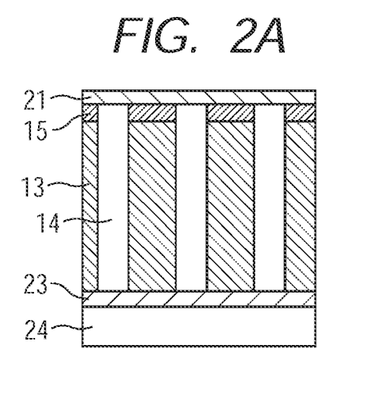
FIGS. 2A, 2B, 2C, 2D and 2E are schematic views illustrating exemplary structures of a detector including the composite scintillator according to the present invention.
Figure 2B:
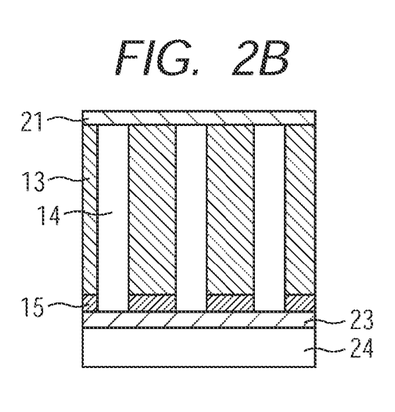
Figure 2C:
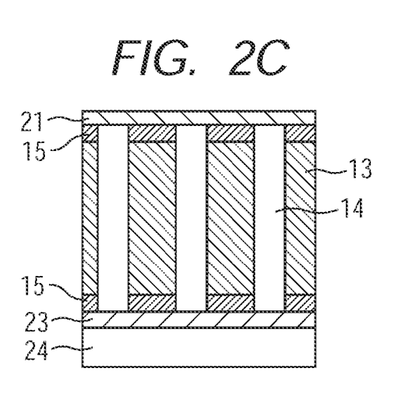
Figure 2D:
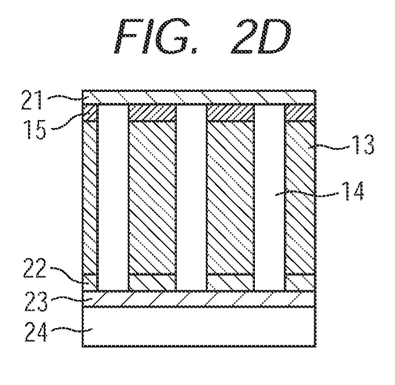

Further, as illustrated in FIG. 2D, a reflecting portion 22 may be provided in a portion of the lower refractive index phase at a surface facing a light receiving surface of the light receiving element, and the absorbing portion 15 may be provided in a portion of the lower refractive index phase at a surface which is opposite to the surface facing the light receiving surface. Even in a case in which the reflecting portion and the absorbing portion are provided in this way, an effect similar to that in a case in which the absorbing portion is provided in each of a portion of the lower refractive index phase at the first surface and portion of the lower refractive index phase at the second surface can be obtained. Note that, the surface facing the light receiving surface of the light receiving element means a surface which emits light to the light receiving surface of the light receiving element of a light receiving element array portion 24. The material which forms the absorbing portion may be of a single phase having a desired absorption coefficient, or may be in a state under which a material which has the absorbing function is dispersed in a resin or in glass. For example, a carbon-based material, a black pigment or dye, or a low bandgap semiconductor material may be dispersed in a resin or the like. It is preferred that the low bandgap be a bandgap which is 2.2 eV or less. In order to provide the absorbing portion in the lower refractive index phase of the scintillator, embedding, drying, cure by light or heat, vapor deposition, or the like may be used. Further, it is preferred that the two kinds of phases which form the scintillator be optical members whose refractive indices can be defined, respectively, and that the phase having the higher refractive index be the scintillator. In this case, the refractive index ratio between the two kinds of phases (refractive index of the lower refractive index phase/refractive index of the higher refractive index phase) is required to be small, and is preferably at least 0.96 or less.

Figure 2E:
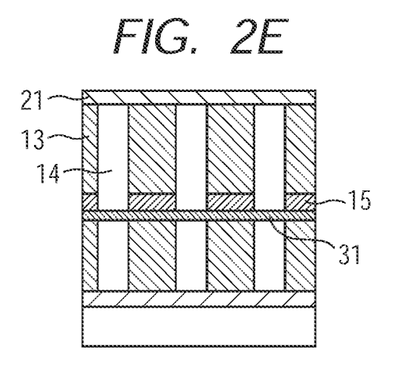
Figure 3:
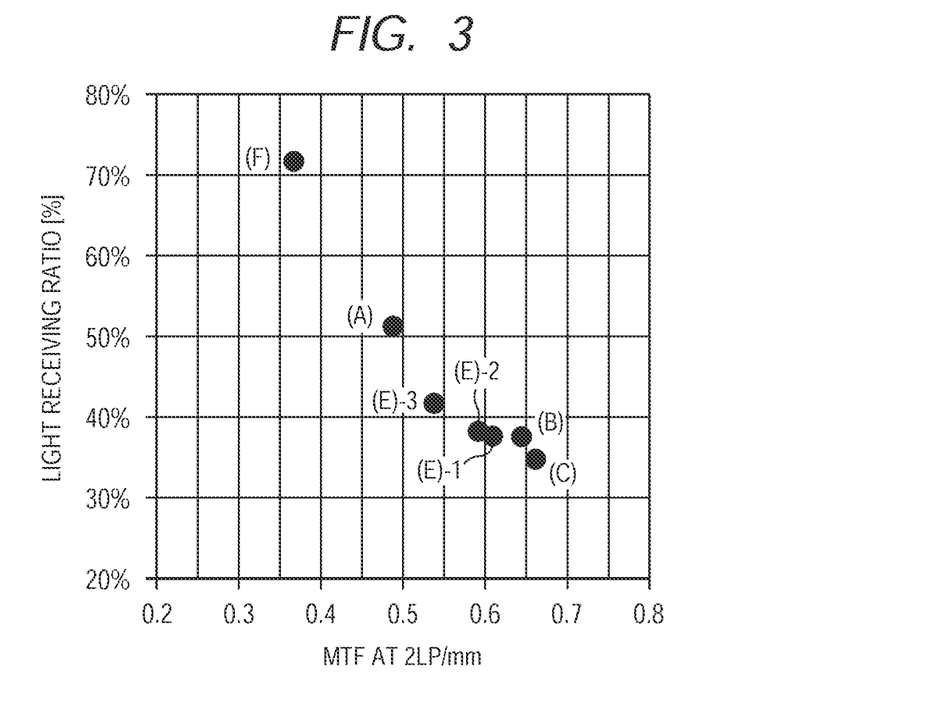
FIG. 3 is a graph showing the relationship between an MTF value and a light receiving ratio of the composite scintillator according to an embodiment of the present invention.

When a high MTF is required to be realized, particularly preferred structures including the light receiving element array portion 24 are, as illustrated in FIGS. 2C and 2B, structures in which the absorbing portion is provided at a surface facing the light receiving surface of the light receiving element. In the structure illustrated in FIG. 2C, the absorbing portion 15 is provided both in a portion in contact with the first surface and in a portion in contact with the second surface. In the structure illustrated in FIG. 2B, the absorbing portion 15 is provided in a portion in contact with one of the first surface and the second surface, and the surface at which the absorbing portion is provided is placed so as to face the light receiving surface of the light receiving element. In the two cases illustrated in FIGS. 2B and 2C, equivalent image contrasts and equivalent light receiving ratios can be obtained. Note that, a surface which is nearer to the light receiving surface of surfaces which are almost in parallel with the light receiving surface is regarded as the surface placed so as to face the light receiving surface. A structure in which the absorbing portion 15 is provided between the first surface and the second surface as illustrated in FIG. 2D comes next. As the distance between the absorbing portion and the light receiving surface of the light receiving element becomes smaller, the MTF is improved more and the light receiving ratio becomes smaller, and thus, the position at which the absorbing portion is provided may be determined taking into consideration the balance between an MTF and a light receiving ratio which are required to be obtained. A structure in which the absorbing portion 15 is provided at one surface and the surface is placed so as to be opposite to a surface facing the light receiving surface of the light receiving element as illustrated in FIG. 2A has characteristics that the MTF thereof is lower than those of the structures illustrated in FIGS. 2B to 2E but the light receiving ratio thereof is larger than those of the structures illustrated in FIGS. 2B to 2E. Whether to provide a reflecting surface 21 or not may be selected depending on which of the amount of received light and the spatial resolution is given a higher priority. A structure illustrated in FIG. 2D is almost the same as the structure illustrated in FIG. 2C described above. The relationship between the MTF value and the light receiving ratio, which provide the consequences as described above, is calculated by simulation, and is plotted as shown in FIG. 3 with regard to the respective structures. Note that, the structure illustrated in FIG. 2E has various MTFs and light receiving ratios in accordance with the position at which the absorbing portion is provided. Details of the simulation whose results are plotted in FIG. 3 are described in Example 2 below.

Further, the light receiving element array portion 24 and the scintillator may be directly bonded together, or a layer 23 such as a protective layer or bonding layer may be placed between the two. Further, it is also effective to provide the light receiving element array portion 24 at a position at which light from the scintillator can form an image through a lens optical system. In this case, insofar as an image can be formed, it is not necessarily required that the surface of the scintillator and the surface of the light receiving element array are substantially in parallel with each other, and the arrangement can be as desired using a mirror and the like.

Figure 4:
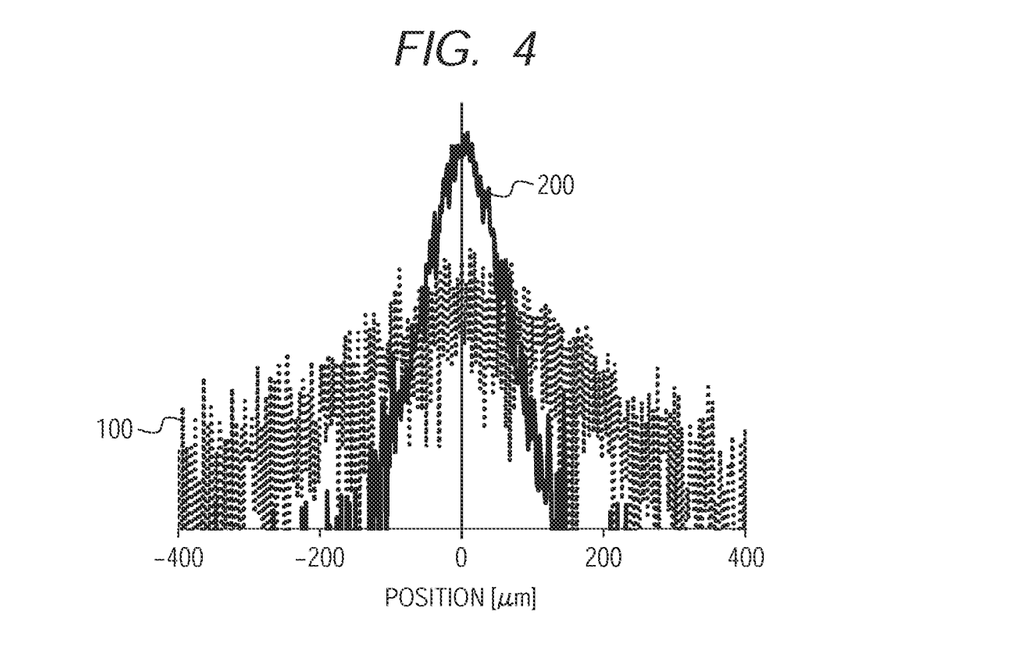
FIG. 4 is a graph showing an exemplary LSF of the composite scintillator according to an embodiment of the present invention.
Figure 5A:
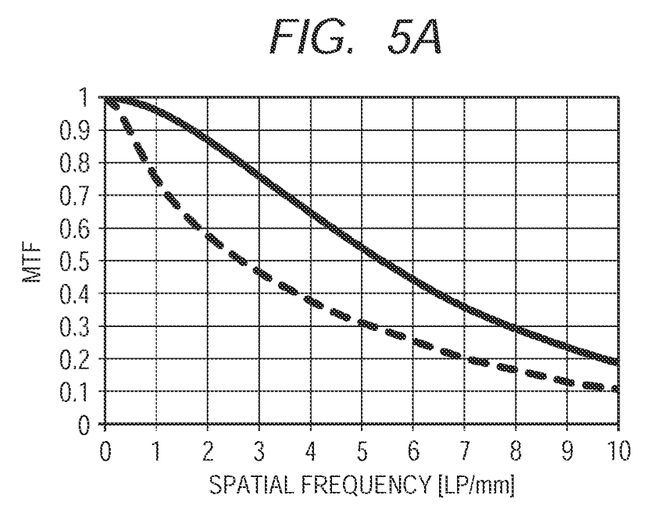
FIGS. 5A and 5B are graphs each showing an MTF curve in the composite scintillator according to an embodiment of the present invention.
Figure 5B:
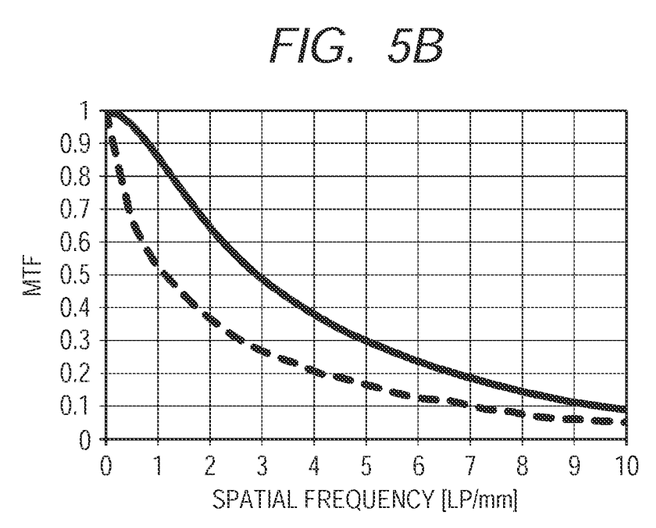
Figure 12:
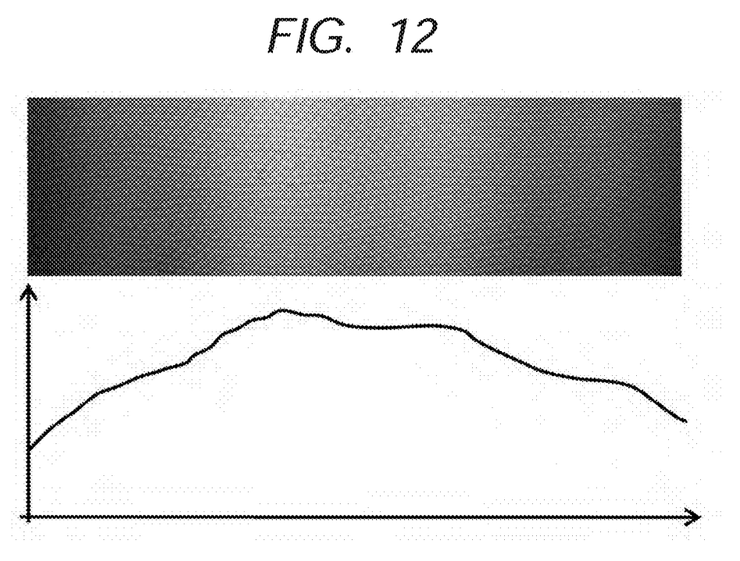
FIG. 12 is an image taken by a detector including a scintillator of a comparative example, and a profile thereof.

Further, a mechanism which produces an effect only by providing the absorbing portion in part of the lower refractive index phase can be confirmed both by simulation and by experiment. For example, the first or second structure without the absorbing portion is assumed. When a line spread function (LSF) is calculated by ray tracing simulation, a case in which light is taken out from the first phases and a case in which light is taken out from the second phase can be separated. As shown in FIG. 4, with regard to both of the structures, light from the lower refractive index phase has a spread distribution 100 shown by dotted lines, while light emitted from the higher refractive index phase has a sharp distribution 200 shown by solid lines. Note that, in the LSF distributions shown in FIG. 4, the horizontal axis denotes the position while the vertical axis denotes the intensity. Further, FIG. 12 shows an image (upper portion) taken by a detector including a comparative example (phase separation scintillator in which no absorbing portion is provided) and a profile thereof (lower portion, the horizontal axis denotes the position while the vertical axis denotes the intensity of the light). As shown in FIG. 12, from the result of the imaging of the comparative example, it can be observed that, in a place which is not exposed with radiation, the ratio of light emitted from the lower refractive index phase to light emitted from the higher refractive index phase is high. Therefore, it can be seen that light emitted from the lower refractive index phase contributes to a large extent to image blurring. This is in good agreement with the result of the simulation. Therefore, in order to improve the resolution and the contrast of an image, it is only required to absorb only light emitted from the lower refractive index phase. Further, although difference due to the refractive indices of the portion from which light is taken out is caused, the effect of the present invention can be obtained with regard to any one of the refractive indices. For example, with regard to cases in which the refractive indices are 1.0 and 1.5, respectively, as shown in FIGS. 5A and 5B, while MTF curves of cases without the absorbing portion are shown by broken lines, MTF curves of cases in which the absorbing portion is provided are shown by solid lines, and it is observed that the MTF value increases over the entire spatial frequency region.

Next, a more preferred scintillator is described.

Scintillator Using Eutectic Phase Separation Structure

A eutectic phase separation structure as a more preferred embodiment of the scintillator is described in the following.

A scintillator having a eutectic phase separation structure includes two kinds of phases, that is, first phases including a large number of columnar crystals having unidirectionality and a second phase positioned around the first phases to fill sides of the first phases. Further, both the first phases and the second phase are crystals. This structure is the same as that of the above-mentioned phase separation scintillator. Eutectic phase separation is the phenomenon used in manufacture, and thus, the structure is called a eutectic phase separation structure. The structure is obtained as a result of unidirectional solidification under a state in which the composition ratio between the material of the first phases and the material of the second phase is close to a eutectic composition ratio, and can be used when the material which is on the higher refractive index side in a eutectic material system functions as a scintillator. To be close to the eutectic composition ratio is to be in a range of ±4 mol% of the eutectic composition ratio. This is the same as to say that a eutectic structure can be obtained insofar as the range is within a so-called eutectic coupled zone.

The following material systems are assumed as material systems which can obtain the eutectic phase separation structure.

TABLE 1

| | Composition ratio | Structure | Refractive index ratio |
|---|---|---|---|
| $Cs_3Cu_2I_5$—KCl | 53:47:00 | First Structure | 0.784 |
| $Cs_3Cu_2I_5$—NaBr | 64:36:00 | First Structure | 0.863 |
| $Cs_3Cu_2I_5$—NaCl | 76:24:00 | First Structure | 0.816 |
| $Cs_3Cu_2I_5$—NaI | 45:55:00 | First Structure | 0.947 |
| CsBr—NaBr | 59:41:00 | First Structure | 0.96 |
| CsBr—NaCl | 60:40:00 | First Structure | 0.91 |
| CsBr—NaF | 94:06:00 | First Structure | 0.77 |
| CsCl—NaCl | 65:35:00 | First Structure | 0.94 |
| CsI—KCl | 60:40:00 | First Structure | 0.83 |
| CsI—KF | 72:28:00 | First Structure | 0.76 |
| CsI—LiCl | 50:50:00 | First Structure | 0.92 |
| CsI—NaBr | 60:40:00 | First Structure | 0.91 |
| CsI—NaCl | 68.5:31.5 | First Structure | 0.86 |
| CsI—NaF | 95:05:00 | First Structure | 0.74 |
| CsI—RbF | 60:40:00 | First Structure | 0.78 |
| CuBr—NaBr | 64:36:00 | First Structure | 0.81 |
| CuCl—NaBr | 72:28:00 | First Structure | 0.79 |
| CuCl—NaCl | 61:39:00 | First Structure | 0.83 |
| CuI—KBr | 75:25:00 | First Structure | 0.655 |
| CuI—KCl | 70:30:00 | First Structure | 0.634 |
| CuI—NaBr | 92:08:00 | First Structure | 0.698 |
| CuI—NaCl | 90:10:00 | First Structure | 0.66 |
| $GdAlO_3$—$Al_2O_3$ | 48:52:00 | Second Structure | 0.885 |
| NaI—NaCl | 60:40:00 | First Structure | 0.84 |
| NaI—NaF | 82:18:00 | First Structure | 0.71 |
| NaI—RbI | 50:50:00 | Second Structure | 0.87 |
| RbBr—NaF | 90:10:00 | First Structure | 0.87 |
| RbCl—NaF | 85:15:00 | First Structure | 0.86 |
| RbI—NaCl | 65:35:00 | First Structure | 0.96 |
| RbI—NaF | 94:06:00 | First Structure | 0.82 |
| ZnO—$ZnF_2$ | 25:75 | Second Structure | 0.75 |

The scintillator according to the present invention, in which the absorbing portion is provided, can be formed using the above-mentioned exemplary material systems. In particular, with regard to the above-mentioned material systems, means for etching only the lower refractive index phase may be used, and after that, the absorbing portion may be provided. Means for providing the absorbing portion is as described above. With regard to the etching, it is preferred that the depth of the etching be about 10 μm using etching means using plasma or chemical reaction in a vapor phase, etching means by dissolution in a solution, or the like. In some cases, it is also preferred that the depth of the etching be as enough as more than 10 μm to provide an absorbing portion having a thickness of less than 10 μm.

Application of Scintillator

The scintillator described above in combination with a light receiving element array or the like may be used as a radiation detector for medical care, for industrial use, for high-energy physics, and for space use. By providing the absorbing portion in part of the lower refractive index phase, the spatial resolution and the image contrast may be improved with efficiency (with more inhibition of reduction in the amount of received light compared with a case in which the absorbing portion with high transmittance is provided in the entire scintillator with no distinction between the lower refractive index phase and the higher refractive index phase).

EXAMPLE 1

This example relates to a suitable method of providing the absorbing portion in the scintillator.

First, grasping of light waveguide characteristics of the scintillator by ray tracing simulation was sought with regard to the first structure and the second structure according to the present invention without the absorbing portion as the models. Further, in each of the structures, the thickness was 500 μm, the refractive index ratio (lower refractive index/higher refractive index) was 0.83, and an Al reflecting surface (the reflectance was assumed to be 90%) was provided on the entire surface on the radiation incidence surface side. Further, the distribution of light beam radiation in the scintillator was caused to be in the shape of a line within a surface (in order to form a line spread function (LSF)), and was caused to be a distribution on the assumption that X-rays were absorbed from an upper surface in a depth direction. Further, light beams were caused to be generated only in the higher refractive index phase. Under these conditions, the emission distribution from a bottom surface of the scintillator of light emitted from the higher refractive index phase thereof was estimated (space to which the light was emitted was assumed to have a refractive index of 1.0). The emission distribution was able to be represented as an LSF. The two structures exhibited distributions in the same shape. Further, the emission distribution was broken down into that with regard to light emitted from the lower refractive index phase and that with regard to light emitted from the higher refractive index phase of the scintillator to obtain the distributions shown in FIG. 4. The emission distribution from the lower refractive index phase was spread as shown by the dotted lines, while the emission distribution from the higher refractive index phase was sharp as shown by the solid lines.

The above-mentioned simulation was carried out with regard to a case in which the space to which the light was emitted had a refractive index of 1.0. The simulation was also carried out with regard to a case in which the space had a refractive index of 1.5, and MTF curves (relationship between the MTF value and the spatial frequency [LP/mm]) which were indices for the image contrast were calculated. FIG. 5A shows the case of n=1.0 while FIG. 5B shows the case of n=1.5. In each of the cases, it was able to confirm that, compared with the MTF curve without the absorbing portion shown by the broken line, the MTF curve when the absorbing portion at a thickness of 0.1 μm was provided (solid line) gave a higher MTF value over the entire spatial frequency region. In this simulation, when the space to which the light was emitted had a refractive index of 1.0, the detector was assumed to have a structure in which an optical member such as an optical lens was provided between the scintillator and the light receiving element array. When the space had a refractive index of 1.5, the scintillator was assumed to be directly bonded to the light receiving element array with a resin or the like. This simulation represented that, in both structures, the effect of the present invention was obtained.

From the above, it was made clear that, in the scintillator, the region in which the absorbing portion was provided was only required to be a region which faced at least one of the surfaces of the lower refractive index phase so that light emitted from the lower refractive index phase was absorbed therein.

Note that, in the first structure, the multiple columns are the lower refractive index phases. When there are multiple lower refractive index phases, it is preferred that the absorbing portion be provided in part of each of the lower refractive index phases. However, even if the absorbing portion is not provided in some of the lower refractive index phases, the effect is not always lost. Further, with regard to a place in which the size of the light receiving element is large and light emission from the lower refractive index phase does not influence the spatial resolution, it is greatly advantageous not to provide the absorbing portion from the viewpoint of the amount of received light.

EXAMPLE 2

This example relates to the structure of the scintillator and the light receiving element.

In Example 1, it was able to confirm that to provide the absorbing portion in the lower refractive index phase was effective. In this example, the positional relationship between the light receiving element and the scintillator was reviewed.

Figure 11:
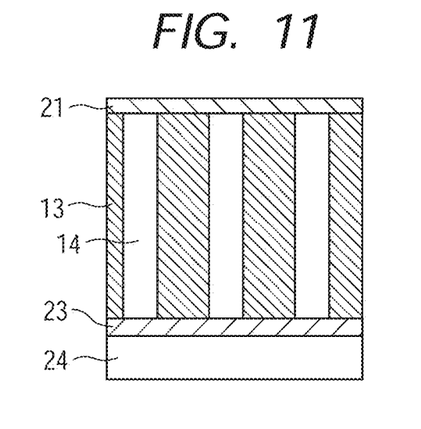
FIG. 11 is a schematic view illustrating a comparative example.

The review of this example was performed with regard to the first structure of Example 1, and the parameters and the structure were the same as those in Example 1 except for the position of the absorbing portion. Referring to FIGS. 2A to 2E, FIG. 2A illustrates a case in which the absorbing portion is placed on side opposite to the light receiving surface of the light receiving element, FIG. 2B illustrates a case in which the absorbing portion is placed on the side of the light receiving surface of the light receiving element, and FIG. 2C illustrates a case in which the absorbing portion is placed on both sides. FIG. 2D illustrates a case in which a reflecting member is providing on the side opposite to the light receiving surface of the light receiving element and the absorbing portion is provided on the side opposite to the light receiving surface of the light receiving element, which is similar to the structure illustrated in FIG. 2A, and thus, is omitted in this example. Further, FIG. 2E illustrates a case in which the absorbing portion is placed at an intermediate position, and a bonding layer having a refractive index of 1.5 is also provided immediately below the absorbing portion. In FIG. 3, (E)-1 is a case in which the distance between a surface facing the light receiving element and the portion is ¼ of the thickness of the scintillator, (E)-2 is a case in which the distance between the surface facing the light receiving element and the absorbing portion ½ of the thickness of the scintillator, and (E)-3 is a case in which the distance between the surface facing the light receiving element and the absorbing portion is ¾ of the thickness of the scintillator. Further, as a comparative example, (F) is a case in which the absorbing portion is not provided as illustrated in FIG. 11.

In this example, the absorbing portion was assumed to have a thickness of 0.1 μm and an absorption coefficient of $7.0 \times 10^5$ [1/cm] or more. Further, a layer having a refractive index of 1.5 was assumed to be inserted between the light receiving element array portion and the scintillator. Under these conditions, ray tracing simulation was performed with regard to the light receiving ratio when the spatial frequency was 2 [LP/mm]. The light receiving ratio is defined as the ratio of the amount of received light to the total amount of light generated in the scintillator. Further, the amount of received light is calculated as the integral of a distribution of light emitted to the layer having a refractive index of 1.5.

The result of the above-mentioned simulation is plotted in FIG. 3. It was able to confirm that the MTF values of the structures in which the absorbing portion was provided were larger than that of the structure illustrated in FIG. 11 in which the absorbing portion was not provided. As shown in FIG. 3, when compared with the MTF value in the structure illustrated in FIG. 11, the ratio of increase of the MTF value becomes more larger stepwise in the order of the structure illustrated in FIG. 2A in which the absorbing portion was provided on the side opposite to the light receiving element side, the structure illustrated in FIG. 2E in which the absorbing portion was provided at an intermediate position, and the structures illustrated in FIG. 2B and FIG. 2C in which the absorbing portion was provided on the light receiving element side. The light receiving ratio was only reduced by a half at the maximum.

It was thus made clear that the structures according to the present invention, which are illustrated in FIGS. 2A to 2F, obtained a satisfactory effect. In particular, it was made clear that the structures illustrated in FIG. 2B and FIG. 2C were more preferred from the viewpoint of the spatial resolution and the image contrast. It was also shown that, in an application in which the lower limit of the amount of received light was set, suitable conditions somewhere between the state illustrated in FIG. 2A and the state illustrated in FIG. 2B were able to be selected by the structure illustrated in FIG. 2E.

EXAMPLE 3

This example relates to the effective thickness of the absorbing portion in the scintillator.

Figure 6:
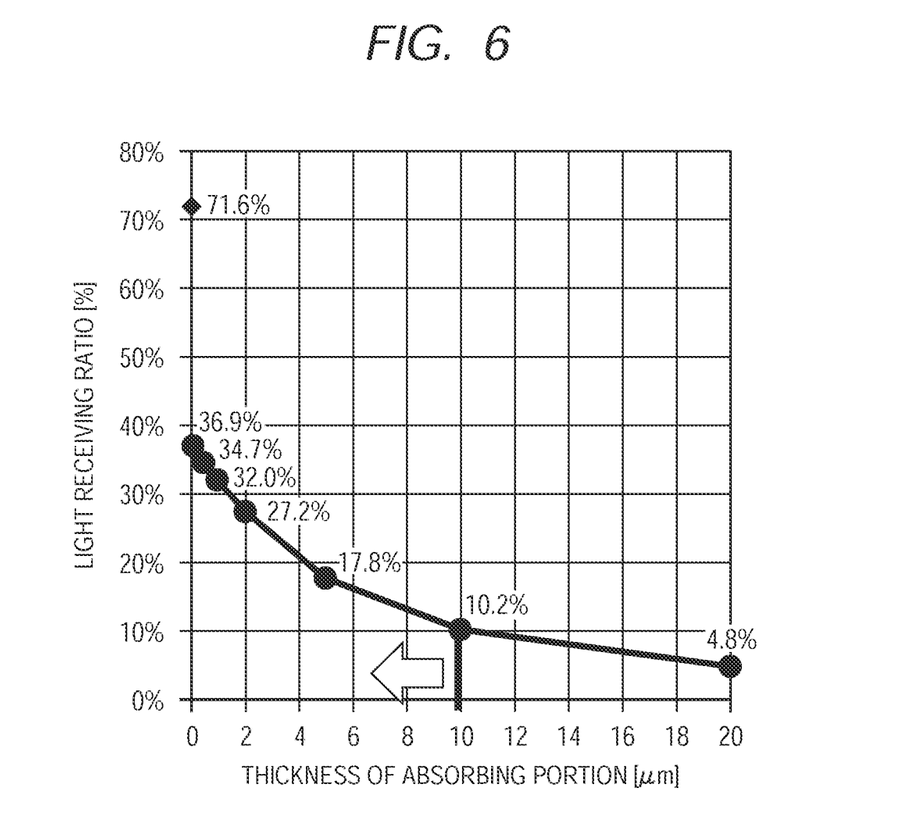
FIG. 6 is a graph showing the relationship between the thickness of an absorbing portion and the light receiving ratio.
Figure 7:
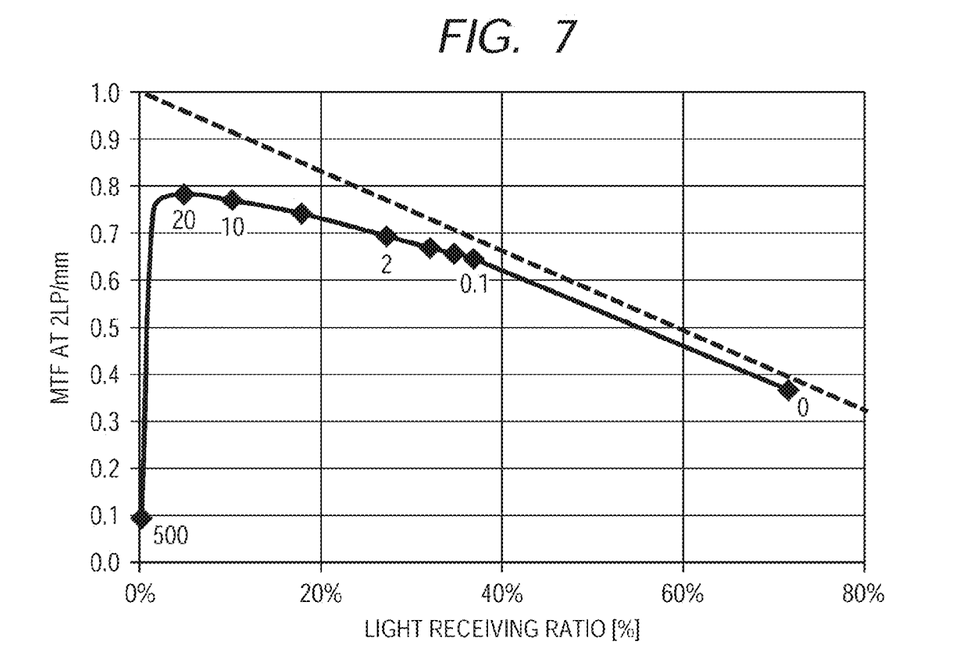
FIG. 7 is a graph showing the relationship between the MTF value and the light receiving ratio.

Simulation was performed with regard to the structure illustrated in FIG. 2B under the conditions of Example 2, with only the thickness of the absorbing portion being varied. FIG. 6 shows the light receiving ratios obtained with regard to the varied thicknesses of the absorbing portion. Taking into consideration time necessary for imaging and noise in imaging, it is practically preferred to secure an amount of received light of 10%. It follows that the thickness of the absorbing portion is preferably 10 µm or less. Further, FIG. 7 is a graph showing the relationship between the light receiving ratio and the MTF value (when the spatial frequency is 2 [LP/mm]). From this figure, it can be said that, as the thickness of the absorbing portion increases, the MTF value is improved, but, as the thickness further increases, the improvement ratio reduces. In particular, it was made clear that, in the first structure (structure in which the first phases were the lower refractive index phase as illustrated in FIGS. 1A and 1C), when the thickness of the absorbing portion was 500 µm (the entire thickness of the scintillator in the simulation), the MTF value was reduced to a large extent. However, even when the thickness of the absorbing portion is equal to the thickness of the scintillator in this way, in the case of the second structure (that is, structure in which the second phase is the lower refractive index phase as illustrated in FIGS. 1B and 1D), such reduction in the MTF value to a large extent is not thought to be caused.

From the above, it was found that the thickness of the absorbing portion of the scintillator of this embodiment was preferably 10 µm or less from the viewpoint of the amount of received light. Further, it was able to confirm that, with regard to the first structure, a too thick absorbing portion reduced the MTF value.

EXAMPLE 4

This example relates to the effective absorption coefficient of the absorbing portion.

The MTF curves shown in FIG. 5B of the structure illustrated in FIG. 2B of Example 2 were calculated as the broken line in the case without the absorbing portion of the scintillator and as the solid line in the case in which the absorbing portion had a thickness of 0.1 µm and an absorption coefficient of $7.0 \times 10^5$ [1/cm]. In this example, an MTF curve in a case in which the absorbing portion had a thickness of 10 µm was similarly calculated. In this case, by providing the absorbing portion, the MTF value was considerably improved, and it was reviewed how small the absorption coefficient of the absorbing portion was able to be set while the greatest effect was obtained. As a result, it was made clear that, when the thickness was 10 µm, if the transmittance of light was 1% or less, the MTF curve asymptotically approached the MTF curve in a case in which the absorption coefficient was sufficiently large. The transmittance was permitted to be up to 1%, and thus, it was made clear that the absorption coefficient was preferably $4.6 \times 10^3$ [1/cm] or more. However, this is a condition insofar as the absorbing portion divides the total amount of incident light into an absorbed component of the light and a transmitted component of the light. When there is a reflected component of the light, it is appropriate to regard the result of subtraction of the reflected component of the light from the total amount of incident light as the amount of incident light. It follows that, with regard to the absorbing portion having a reflectance R, the requirement of the absorption coefficient is relaxed. When the absorbing portion has a reflectance of 50%, it is enough that the absorption coefficient is $3.9 \times 10^3$ [1/cm] or more.

EXAMPLE 5

This example relates to the manufacture of the scintillator.

First, as exemplary case of the manufacture, a case in which a phase separation scintillator, particularly a CsI—NaCl-based one, was manufactured is described, Using the Czochralski process, a crystal having the eutectic phase separation structure was pulled up from. Csi—NaCl eutectic composition melt to which 0.1 mol/% of TlI was added. The crystal was sliced along a plane perpendicular to the axis of the pull-up so as to have a thickness of 0.5 mm and was mirror polished. At that time, the sample had the first structure in which the first phases were NaCl columns as the lower refractive index phase while the second phase was formed of CsI having a higher refractive index. Of course, it was confirmed that CsI to which Tl was added, which had a higher refractive index, functioned as a scintillator. NaCl of this sample had a diameter of about 1.7 µm, and a period of about 3.6 µm which was an average distance between the columns. Half of the sample was masked, and the remaining half was etched by methanol for a minute at room temperature to etch out the NaCl columns having a lower refractive index to a depth of about 12 µm. After that, black ink as the absorbing portion was applied to the surface of the sample and was dried. Then, the surface was precision polished to reduce the thickness of the black ink region from 12 µm to 6 µm. As the black ink, black Magic Ink manufactured by Teranishi Chemical Industry Co., Ltd. was used. The absorption coefficient was about $2.1 \times 10^4$ [1/cm] from the measurement of the transmittance, which was an absorption coefficient in a range of the present invention.

Figure 8A:
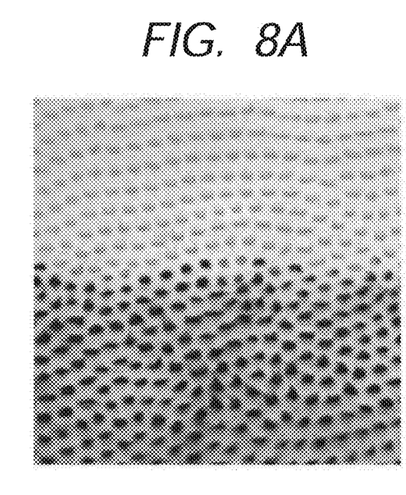
FIGS. 8A and 8B are images under an optical microscope of the composite scintillator according to an embodiment of the present invention.
Figure 8B:
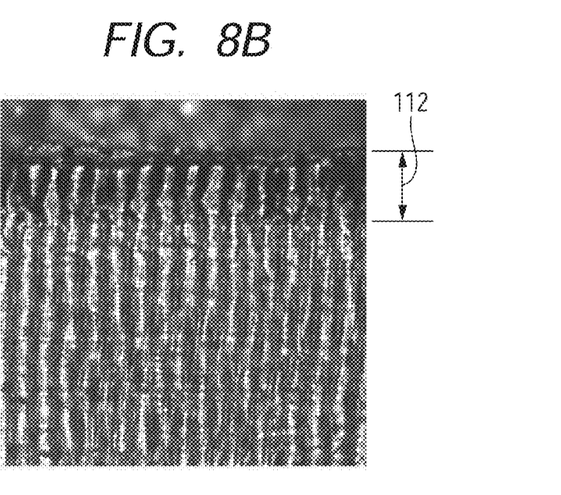

FIG. 8A is an image under an optical microscope formed by light transmitted through the sample. A border portion between the processed portion and the masked portion was observed, and it was confirmed that the absorbing portion was provided only in the columns. Further, the brightness of the CsI portion which was the higher refractive index phase was the same between the processed portion and the masked portion, and thus, it was confirmed that the absorbing portion almost did not exert influence on light emitted from the higher refractive index phase. FIG. 8B is the region in which the absorbing portion was provided observed from a section of the sample. It can be seen that absorbing portion having a thickness of 6 µm was evenly provided. There were a large number of columns in a depth direction, and thus, the image in section was a dark-field image under an optical microscope using overhead light for the sake of easy observation.

It was shown than the absorbing portion at a thickness of 10 µm or less was able to be formed in the scintillator of this embodiment.

EXAMPLE 6

This example relates to imaging using scintillators actually manufactured.

By a manufacturing method similar to that in Example 5, a scintillator in which the absorbing portion was not provided (comparative example) and a scintillator in which the absorbing portion was provided (this example) were prepared. Similarly to the case of Example 5, the absorbing portion had a thickness of about 6 µm. Further, this time, the Al reflecting surface was not provided on the X-ray incident side in the samples. Further, for the sake of observation of the actual nature of the optical waveguide, the imaging was made by the light receiving element array after enlargement by a lens optical system. As the subject, a portion having a spatial frequency of 10 [LP/mm] in a Pb test chart was used. X-rays were applied under a state in which a voltage of 40 kV was applied to an Ag target. The columns of the scintillator had a diameter of about 1.7 μm, and the imaging system was able to image each of the columns. Further, attention was paid not to use only part of an angular distribution of light emitted from the scintillator relying on an aperture of a magnifying lens in the lens optical system. Therefore, influence of higher resolution by the lens optical system is not included in the result below.

Figure 9:
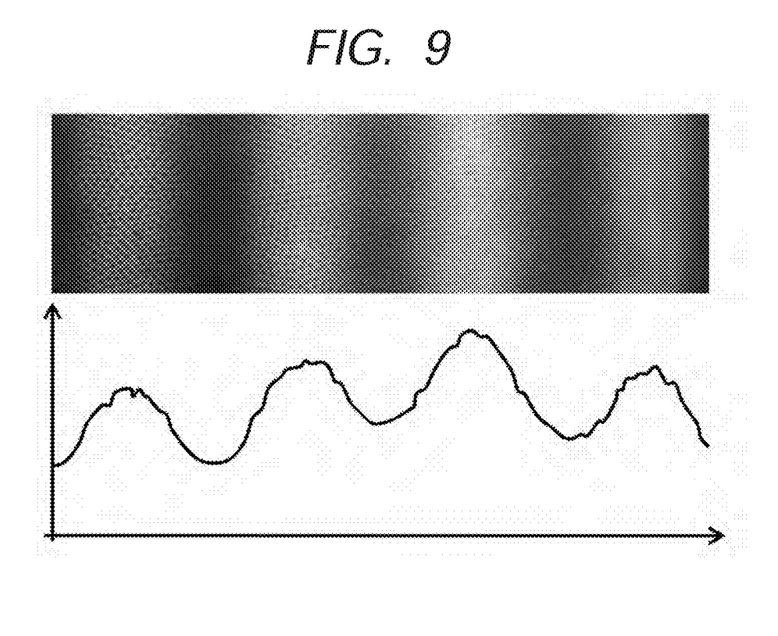
FIG. 9 is an image taken by a detector including the composite scintillator according to an example of the present invention, and a profile thereof.

FIG. 12 is an image (upper portion) taken by a detector including a scintillator of the comparative example and a profile thereof (lower portion), and FIG. 9 is an image (upper portion) taken by a detector including a scintillator of this example and a profile thereof (lower portion).

The result was that, when the absorbing portion was not provided as shown in FIG. 12, only slight variations of light and shade of 50 μm in the test chart was able to be recognized. Further, it was a feature of the image to have bright columns of the lower refractive index phase. On the other hand, in the case of a scintillator in which the absorbing portion was provided, as shown in FIG. 9 it was confirmed that high-contrast imaging was possible. Of course, it was able to confirm that light was absorbed in the columns in which the absorbing portion was provided, and each of the columns looked dark. Further, the amount of received light in the entire imaging area was integrated, and reduction in the light amount was as small as about 43% even when the absorbing portion was provided. The assumption was that the reduction in the light amount could be 70% or more, but it was confirmed that a bright image was able to be taken. In comparison of the horizontal line profile between the images, it was confirmed that the scintillator in which the absorbing portion was provided of the present invention exhibited a high MTF value. Brightness of the image shown in FIG. 9 is adjusted for the sake of easy observation, but the relative values of the light amount are as described above. Finally, in a case in which the lens optical system was not used and the scintillator was directly bonded to the light receiving element array, although each of the columns were not recognized, it was confirmed that the taken image had a high contrast.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-042880, filed Mar. 5, 2013, and Japanese Patent Application No. 2014-031327, filed Feb. 21, 2014, which are hereby incorporated by reference herein in their entirety.

What is claimed is:

1. A scintillator, which has a first surface and a second surface that are not located on a same surface, the scintillator comprising:
multiple first phases; and
a second phase positioned around the multiple first phases,
wherein:
a refractive index with respect to a wavelength range of scintillator light of the multiple first phases and a refractive index with respect to the wavelength range of the scintillator light of the second phase are different from each other;
the scintillator further comprises an absorbing portion for absorbing the scintillator light, the absorbing portion being provided between the first surface and the second surface in one of the multiple first phases and the second phase, which has a lower refractive index; and
one of the multiple first phases and the second phase, which has a higher refractive index, is exposed at the first surface and the second surface.

2. The scintillator according to claim 1, wherein the absorbing portion has a thickness smaller than a thickness of the scintillator.

3. The scintillator according to claim 1, wherein:
the second phase generates the scintillator light by being exposed by radiation;
the refractive index of the multiple first phases is lower than the refractive index of the second phase; and
the absorbing portion is provided in each of the multiple first phases.

4. The scintillator according to claim 3, wherein the multiple first phases and the second phase form a eutectic structure.

5. The scintillator according to claim 1, wherein each of the multiple first phases is a columnar crystal.

6. The scintillator according to claim 1, wherein the absorbing portion is provided so as to be in contact with at least the first surface.

7. The scintillator according to claim 1, wherein:
the scintillator is formed by bonding a first phase separation scintillator and a second phase separation scintillator with a bonding layer therebetween; and
the absorbing portion is provided so as to be prevented from being in contact with the first surface and the second surface.

8. The scintillator according to claim 1, wherein the multiple first phases are exposed at the first surface and the second surface.

9. The scintillator according to claim 8, wherein the multiple first phases continuously exist from the first surface to the second surface, and the second phase continuously exists from the first surface to the second surface.

10. The scintillator according to claim 5, wherein the absorbing portion is configured such that transmittance of the scintillator light which enters the absorbing portion in a direction parallel to a thickness direction of the absorbing portion is 1% or less.

11. The scintillator according to claim 5, wherein a thickness of the absorbing portion in a thickness direction of columnar crystals is 10 μm or less.

12. The scintillator according to claim 5, wherein a thickness of the absorbing portion is 50% or less of a thickness of columnar crystals.

13. The scintillator according to claim 1, wherein the absorbing portion has a reflectance with respect to the scintillator light of 90% or less.

14. The scintillator according to claim 13, wherein the absorbing portion is made of a material having an absorption coefficient with respect to the scintillator light of $2.3 \times 10^3$ [1/cm] or more.

15. The scintillator according to claim 1, wherein the multiple first phases and the second phase form a eutectic structure.

16. The scintillator according to claim 15, wherein a composition ratio between the multiple first phases and the second phase is within a range of ±4 mol% of a eutectic composition ratio between a material forming the multiple first phases and a material forming the second phase.

17. A radiation detector, comprising:
the scintillator according to claim 1; and
a light receiving element for detecting light from the scintillator.

18. The radiation detector according to claim 17, wherein the scintillator and the light receiving element are bonded together with a layer therebetween.

19. The radiation detector according to claim 18, wherein the layer has a refractive index with respect to the wavelength range of the scintillator light, which is lower than the refractive index in the one of the multiple first phases and the second phase, which has the higher refractive index.

20. The radiation detector according to claim 17, wherein the scintillator and the light receiving element are disposed such that light emitted from the first surface is detected by the light receiving element.

21. The radiation detector according to claim 20, further comprising a reflecting member for reflecting the scintillator light, wherein the reflecting member is placed so as to be in contact with the second surface.

22. The radiation detector according to claim 17, further comprising a lens optical system disposed between a light receiving surface of the light receiving element and the scintillator.

23. The scintillator according to claim 1, wherein the one of the multiple first phases and the second phase, which has the higher refractive index, guides a light with a total reflection mode.

24. A scintillator, which has a first surface and a second surface that are not located on a same surface, the scintillator comprising:
multiple first phases; and
a second phase positioned around the multiple first phases,
wherein:

a refractive index with respect to a wavelength range of scintillator light of the multiple first phases and a refractive index with respect to the wavelength range of the scintillator light of the second phase are different from each other; and the scintillator further comprises an absorbing portion for absorbing the scintillator light, the absorbing portion being provided between the first surface and the second surface in one of the multiple first phases and the second phase, which has a lower refractive index.

25. The scintillator according to claim 24, wherein the absorbing portion has a thickness smaller than a thickness of the scintillator.

26. The scintillator according to claim 24, wherein:
the second phase generates the scintillator light by being exposed by radiation;
the refractive index of the multiple first phases is lower than the refractive index of the second phase; and
the absorbing portion is provided in each of the multiple first phases.

27. The scintillator according to claim 26, wherein the multiple first phases and the second phase form a eutectic structure.

28. The scintillator according to claim 24, wherein each of the multiple first phases is a columnar crystal.

29. The scintillator according to claim 24, wherein the multiple first phases continuously exist from the first surface to the second surface, and the second phase continuously exists from the first surface to the second surface.

30. The scintillator according to claim 24, wherein the absorbing portion is provided at a surface side of the scintillator that would face a light receiving element.

31. A radiation detector, comprising:
the scintillator according to claim 24; and
a light receiving element for detecting light from the scintillator.

* * * * *